US012224511B2

(12) United States Patent
Asano et al.

(10) Patent No.: US 12,224,511 B2
(45) Date of Patent: Feb. 11, 2025

(54) TERMINAL FITTING AND CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasunori Asano, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 459 days.

(21) Appl. No.: 17/615,345

(22) PCT Filed: May 27, 2020

(86) PCT No.: PCT/JP2020/020880
§ 371 (c)(1),
(2) Date: Nov. 30, 2021

(87) PCT Pub. No.: WO2020/255651
PCT Pub. Date: Dec. 24, 2020

(65) Prior Publication Data

US 2022/0224028 A1 Jul. 14, 2022

(30) Foreign Application Priority Data

Jun. 17, 2019 (JP) ................................ 2019-111753

(51) Int. Cl.
*H01R 12/55* (2011.01)
*H01R 13/631* (2006.01)

(52) U.S. Cl.
CPC ......... *H01R 12/55* (2013.01); *H01R 13/6315* (2013.01)

(58) Field of Classification Search
CPC ........ H01R 12/55; H01R 12/57; H01R 12/58; H01R 12/585; H01R 13/6315; H01R 13/428; H01R 35/00; H01R 35/04
See application file for complete search history.

(56) References Cited

U.S. PATENT DOCUMENTS 4,867,713 A * 9/1989 Ozu ......................... H01H 1/54 439/833
8,926,352 B2 * 1/2015 Wang ..................... H01R 12/57 439/250

(Continued)

FOREIGN PATENT DOCUMENTS

CN 201594606 U 9/2010
JP H01-168982 U 11/1989

OTHER PUBLICATIONS

International Search Report issued on Jul. 14, 2020 for WO 2020/255651 A1 (4 pages).

*Primary Examiner* — Renee S Luebke
*Assistant Examiner* — Paul D Baillargeon
(74) *Attorney, Agent, or Firm* — Venjuris, P.C.

(57) ABSTRACT

It is aimed to provide a terminal fitting and a connector capable of ensuring connection reliability. A terminal fitting includes a terminal connecting portion to be connected to a mating terminal fitting and a board connecting portion to be connected to a circuit board. The terminal connecting portion is provided in a first member. The board connecting portion is provided in a second member different from the first member. The first member and the second member are so coupled that relative positions of the terminal connecting portion and the board connecting portion are displaceable. A (Continued)

housing includes a supporting portion for rotatably supporting the first member and the second member.

4 Claims, 5 Drawing Sheets

(56) References Cited

U.S. PATENT DOCUMENTS

| | | | |
|---|---|---|---|
| 9,401,559 | B2 | 7/2016 | Ota et al. |
| 2013/0210247 | A1 | 8/2013 | Wang et al. |

* cited by examiner

TERMINAL FITTING AND CONNECTOR

CROSS REFERENCE TO RELATED APPLICATIONS

This application is a national phase of PCT application No. PCT/JP2020/020880, filed on 27 May 2020, which claims priority from Japanese patent application No. 2019-111753, filed on 17 Jun. 2019, all of which are incorporated herein by reference.

TECHNICAL FIELD

The present disclosure relates to a terminal fitting and a connector.

BACKGROUND

A connector described in Patent Document 1 includes a housing having a vertical wall, a first terminal to be press-fit into a first hole of the vertical wall and a second terminal to be press-fit into a second hole of the vertical wall. The first and second terminals respectively include a first contact portion and a second contact portion (hereinafter, referred to as terminal connecting portions) projecting toward a connection side to a mating housing, and a first leg portion and a second leg portion (hereinafter, referred to as board connecting portions) projecting toward a member serving as a mounting destination (hereinafter, referred to as a circuit board). The first terminal contacts wall surfaces on both widthwise sides with a pressure, out of wall surfaces constituting the first hole of the vertical wall.

PRIOR ART DOCUMENT

Patent Document

Patent Document 1: JP 2015-210899 A

SUMMARY OF THE INVENTION

Problems to be Solved

If the connector is heated using a heating device such as a reflow furnace, the housing and the circuit board may be deformed to warp due to a heat load. There is a difference in thermal expansion coefficient between the housing and the circuit board. In the case of Patent Document 1, the first terminal is displaceable in a height direction with respect to the vertical wall. Thus, if the housing and the circuit board are deformed and the terminal connecting portion of the first terminal moves downward or upward from a predetermined position according to the deformation of the circuit board, the tip of the terminal connecting portion of the first terminal is possibly displaced upward or downward from the predetermined position. If the tip of the terminal connecting portion is displaced upward or downward, a mating terminal fitting provided in the mating housing is not opposed to the terminal connecting portion, the both terminal fittings are connected from oblique directions and a load is applied to both the terminal connecting portion side and the board connecting portion side when the connector is connected. As a result, there is a concern that the terminal fitting cannot ensure connection reliability as a whole. Such a concern occurs when the terminal fitting is arranged in a posture inclined from a proper posture with respect to the housing.

Accordingly, it is aimed to provide a terminal fitting and a connector capable of ensuring connection reliability.

Means to Solve the Problem

The present disclosure is directed to a terminal fitting with a terminal connecting portion to be connected to a mating terminal fitting, and a board connecting portion to be connected to a circuit board, wherein the terminal connecting portion is provided in a first member, the board connecting portion is provided in a second member different from the first member, and the first and second members are so coupled that relative positions of the terminal connecting portion and the board connecting portion are displaceable.

Effect of the Invention

According to the present disclosure, it is possible to provide a terminal fitting capable of ensuring connection reliability.

DETAILED DESCRIPTION TO EXECUTE THE INVENTION

[Description of Embodiments of Present Disclosure]

Figure 1:
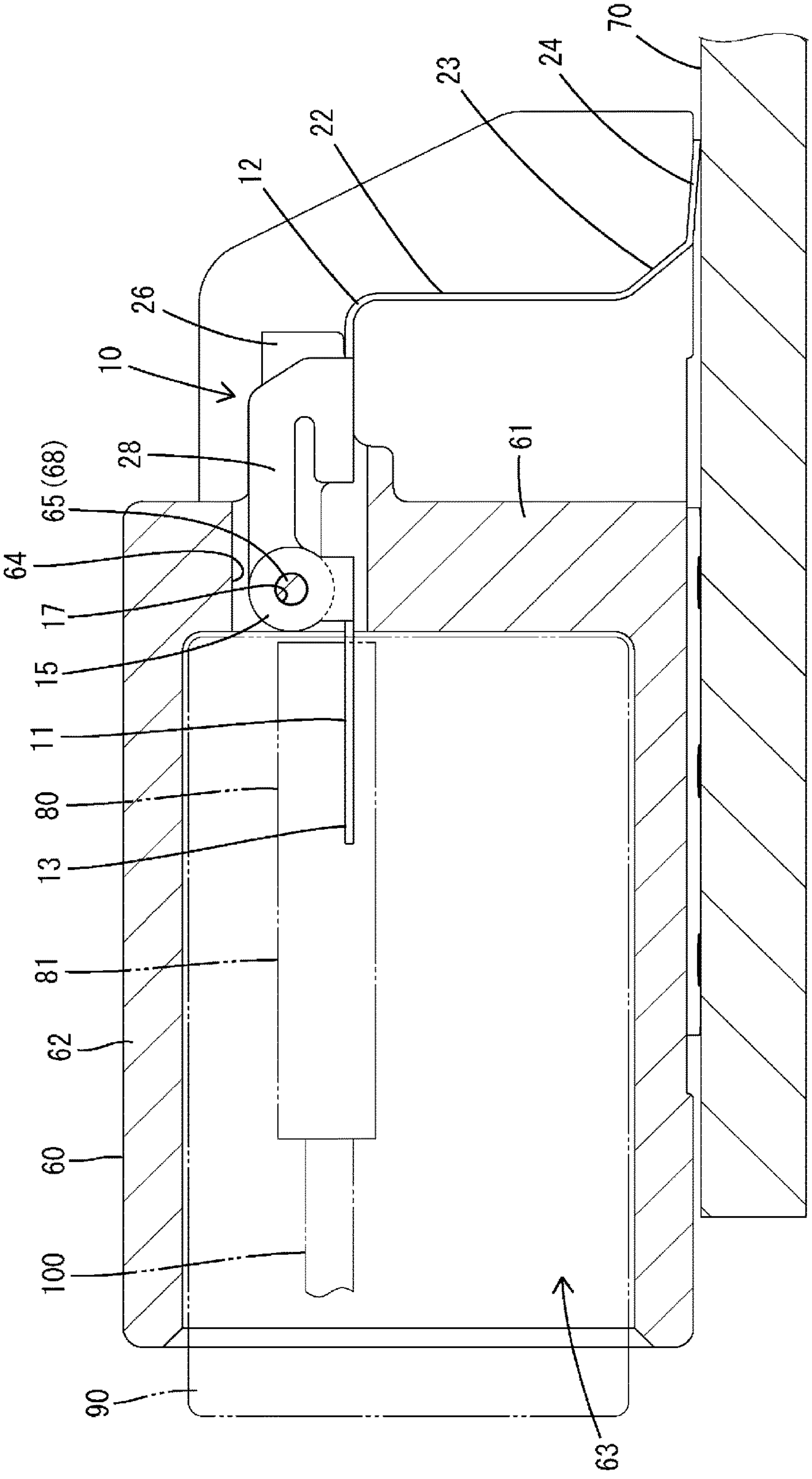
FIG. 1 is a side view in section of a housing having a terminal fitting disposed therein and mounted on a circuit board in a connector according to an embodiment.

First, embodiments of the present disclosure are listed and described.

(1) The terminal fitting of the present disclosure includes a terminal connecting portion to be connected to a mating terminal fitting, and a board connecting portion to be connected to a circuit board, wherein the terminal connecting portion is provided in a first member, the board connecting portion is provided in a second member different from the first member, and the first and second members are so coupled that relative positions of the terminal connecting portion and the board connecting portion are displaceable. Even if a connection position of the board connecting portion to the circuit board moves upward or downward from a predetermined position, an upward or downward displacement amount of the tip of the terminal connecting portion can be reduced or eliminated since the relative positions of the board connecting portion and the terminal connecting portion are displaceable. Therefore, the terminal connecting portion is effortlessly connected in a predetermined posture to the mating terminal fitting and a load applied to the board connecting portion is also reduced. As a result, the terminal fitting can ensure connection reliability as a whole.

(2) Preferably, the first and second members are rotatably coupled. According to this configuration, a mechanism for making the relative positions of the board connecting portion and the terminal connecting portion displaceable is not particularly complicated.

(3) One of the first and second members may be provided with a resilient portion including a bearing portion and the other may be provided with a shaft portion to be fit into the bearing portion. The shaft portion can be fit into the bearing portion with a deep engagement margin by being accompanied by the deflection of the resilient portion, and a coupled state of the first and second members can be satisfactorily maintained.

(4) The one member may be the second member, the resilient portion may be provided in the second member, and a center of gravity of the terminal fitting may be located on the side of the second member. Since the center of gravity of the terminal fitting is located on the side of the second member, a connected state of the board connecting portion to the circuit board can be satisfactorily maintained. Further, the center of gravity of the terminal fitting can be located on the side of the second member by the weight of the resilient portion and it is not necessary to provide a special structure for locating the center of gravity on the side of the second member.

(5) The relative positions of the board connecting portion and the terminal connecting portion may be displaceable in a direction orthogonal to a direction in which the resilient portion is deflected and deformed. According to this configuration, the mutual interference of displacements of the board connecting portion and the terminal connecting portion and the deflection of the resilient portion can be prevented and the connection reliability of the terminal fitting can be satisfactorily ensured.

(6) A connector may include the terminal fitting described above and a housing for disposing the terminal fitting, the housing including a supporting portion for rotatably supporting the first and second members. According to this configuration, the terminal fitting is rotatable while being supported in the housing. Further, the coupled state of the first and second members can be satisfactorily maintained by the supporting portion.

[Details of Embodiment of Present Disclosure]

Specific examples of a terminal fitting and a connector of the present disclosure are described with reference to the drawings. Note that the present disclosure is not limited to this illustration and is intended to be represented by claims and include all changes in the scope of claims and in the meaning and scope of equivalents.

As shown in FIG. 1, a terminal fitting 10 is disposed in a connector 60 of a connector. The housing 60 is connected to a mating housing 90. The terminal fitting 10 is electrically connected to a mating terminal fitting 80 disposed in the mating housing 90. The mating terminal fitting 80 is a female terminal fitting including a tubular box portion 81 and is connected to an end part of a wire 100.

<Housing 60>

The housing 60 is made of synthetic resin and, as shown in FIG. 1, placed on the upper surface (surface) of a circuit board 70. The housing 60 includes a back wall 61 arranged along a vertical direction and a peripheral wall 62 in the form of a rectangular tube projecting forward from the outer peripheral edge of the back wall 61. The housing 60 has a fitting space 63 open forward inside. The mating housing 90 is fit and inserted into the fitting space 63.

Figure 2:
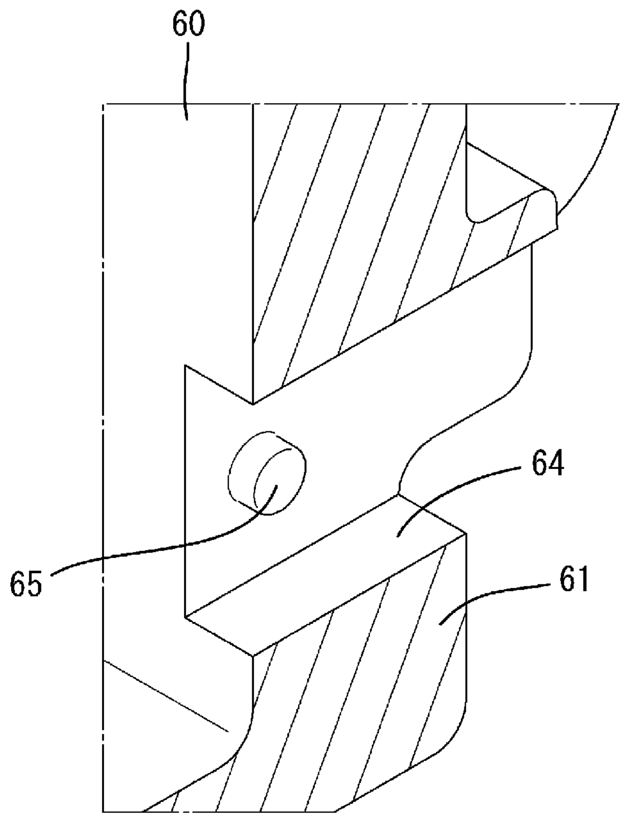
FIG. 2 is an enlarged perspective view partly in section showing a one-side supporting portion provided on one side surface of an insertion hole of a back wall in the connector of the embodiment.
Figure 3:
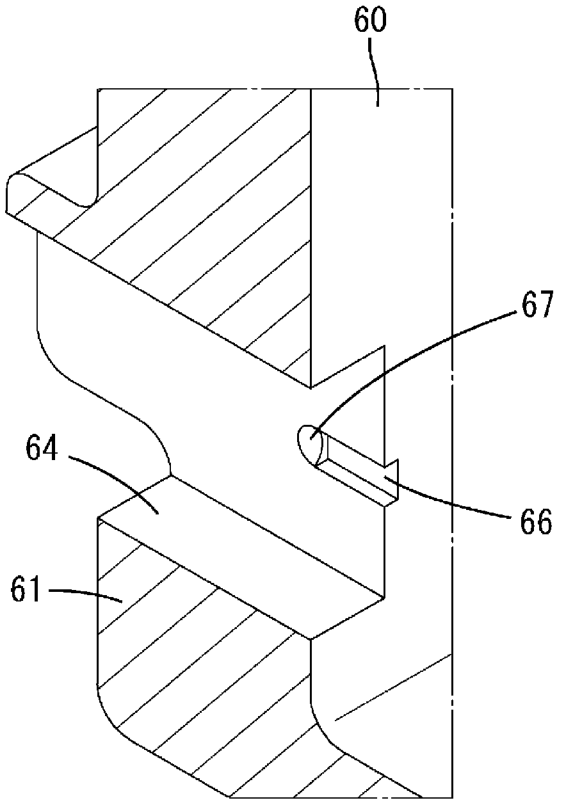
FIG. 3 is an enlarged perspective view partly in section showing an other-side supporting portion provided on the other side surface of the insertion hole of the back wall in the connector of the embodiment.

The back wall 61 includes a plurality of insertion holes 64 (only one is shown in FIG. 1) penetrating in a front-rear direction. The terminal fittings 10 are inserted into the insertion holes 64 from behind. As shown in FIG. 2, the housing 60 includes a cylindrical one-side supporting portion 65 projecting on one side surface in a width direction on the inner surface of the insertion hole 64 of the back wall 61. Further, as shown in FIG. 3, the housing 60 includes a groove-like other-side supporting portion 66 extending in the front-rear direction on the other side surface in the width direction on the inner surface of the insertion hole 64 of the back wall 61. The front end of the other-side supporting portion 66 is open in the front surface of the back wall 61. A rear end part of the other-side supporting portion 66 has a concavely curved supporting surface 67.

The supporting surface 67 of the other-side supporting portion 66 and the one-side supporting portion 65 are arranged at coaxial positions in the width direction to overlap each other in the front-rear direction and vertical direction. Specifically, the supporting surface 67 of the other-side supporting portion 66 and the one-side supporting portion 65 are arranged on a front side and in a vertically intermediate part of the insertion hole 64.

<Terminal Fittings 10>

Figure 5:
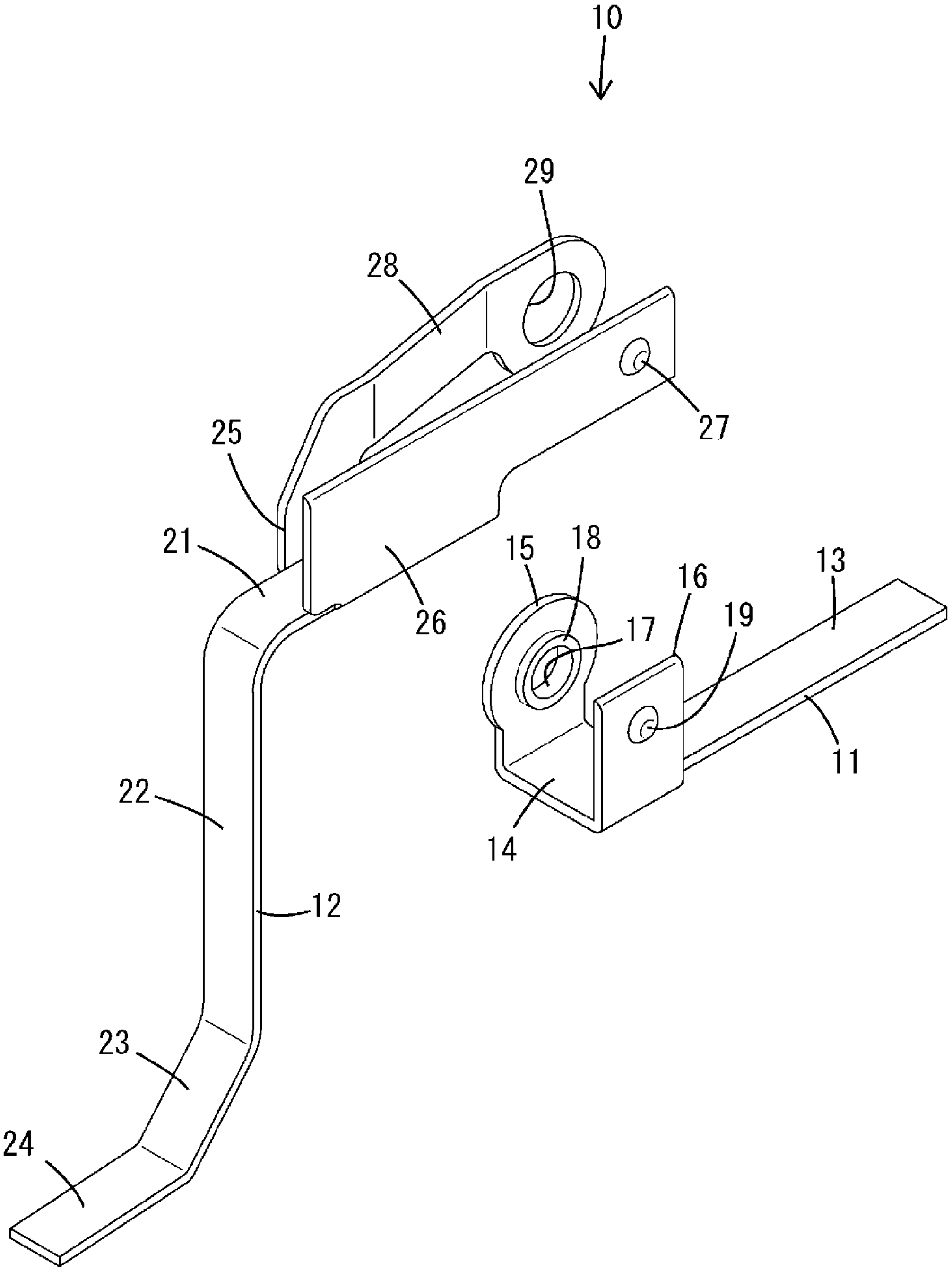
FIG. 5 is an exploded perspective view of the terminal fitting of the embodiment.

The terminal fitting 10 is integrally formed, such as by bending after a conductive metal plate is stamped. As shown in FIG. 5, the terminal fitting 10 is composed of a first member 11 and a second member 12 different from the first member 11.

Figure 6:
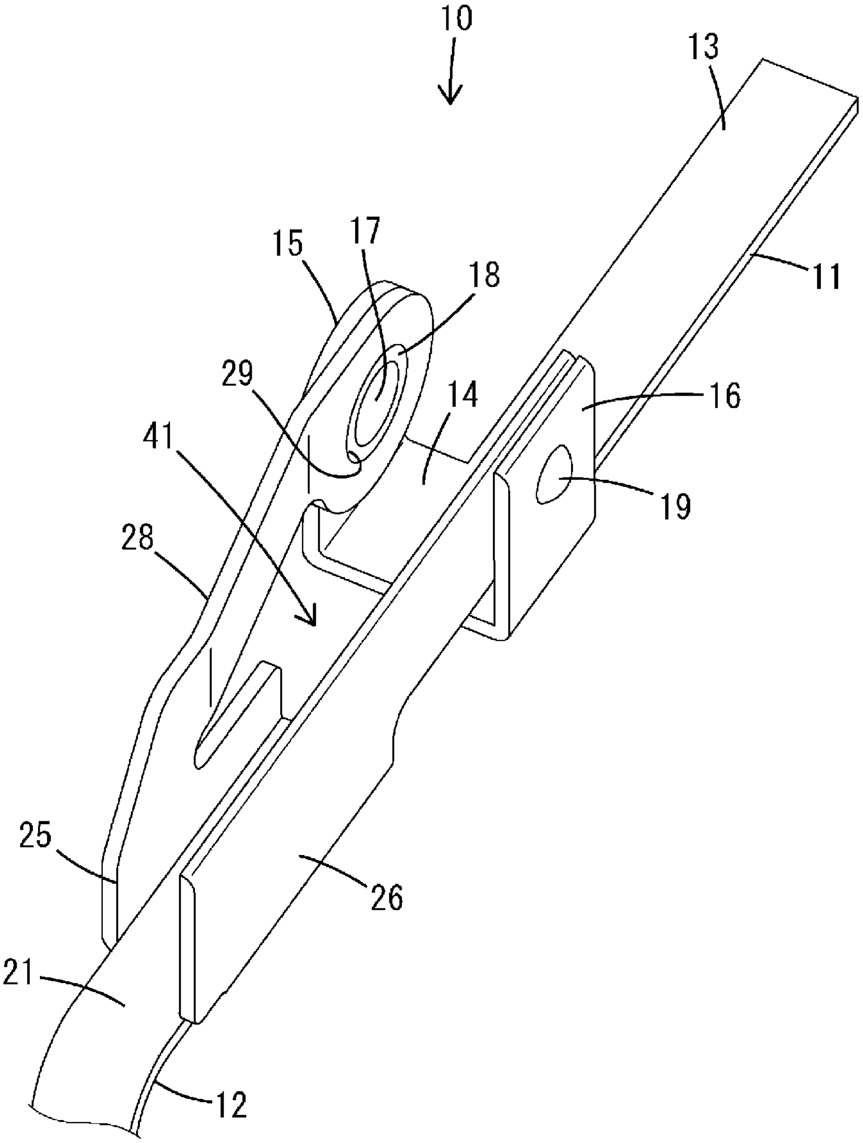
FIG. 6 is an enlarged perspective view showing a coupled part of a first member and a second member in the terminal fitting of the embodiment.

As shown in FIGS. 5 and 6, the first member 11 includes a terminal connecting portion 13 in the form of a flat plate extending in the front-rear direction and a base end portion 14 in the form of a flat plate connected to and behind the terminal connecting portion 13 without any step. The terminal connecting portion 13 and the base end portion 14 are arranged with plate surfaces facing upward and downward. The base end portion 14 includes a part protruding toward one side in the width direction and is formed to be wider than the terminal connecting portion 13. The terminal connecting portion 13 is inserted into the box portion 81 of the mating terminal fitting 80 and the upper and lower plate surfaces contact contact point parts in the box portion 81. In this way, the both terminal fittings 10, 80 are electrically connected.

The first member 11 includes a one-side rising portion 15 rising from one side end in the width direction of the base end portion 14 and an other-side rising portion 16 rising from the other side end in the width direction of the base end portion 14. The one-side and other-side rising portions 15, 16 are facing each other in the width direction and arranged such that plate surfaces are facing in the width direction orthogonal to the base end portion 14.

The one-side rising portion 15 has a body part ring-shaped in a side view and includes a circular hole portion 17 penetrating in the width direction (plate thickness direction) in a central part. The one-side rising portion 15 includes a shaft portion 18 ring-shaped in a side view and projecting over the entire circumference on an opening edge part of the hole portion 17 in an inner surface (surface facing the other-side rising portion 16). The other-side rising portion 16 is in the form of a plate rectangular in a side view and includes a first bulging portion 19 at a position coaxial with the hole portion 17 in the width direction. The first bulging portion 19 is formed to hemispherically bulge on the outer surface of the other-side rising portion 16 by striking the inner surface of the other-side rising portion 16.

As shown in FIG. 5, the second member 12 includes a base portion 21 in the form of a flat plate extending in the front-rear direction, an extending portion 22 bent and extending downward from the rear end of the base portion 21, a relay portion 23 inclined downward from the lower end of the extending portion 22, and a board connecting portion 24 extending rearward from the lower end of the relay portion 23. The base portion 21 and the board connecting portion 24 are arranged with plate surfaces facing upward and downward. The extending portion 22 is arranged with plate surfaces facing forward and rearward. As shown in FIG. 1, the board connecting portion 24 is arranged along the surface of the circuit board 70 and connected to a conductive part formed on the surface of the circuit board 70 by reflow soldering.

Figure 4:
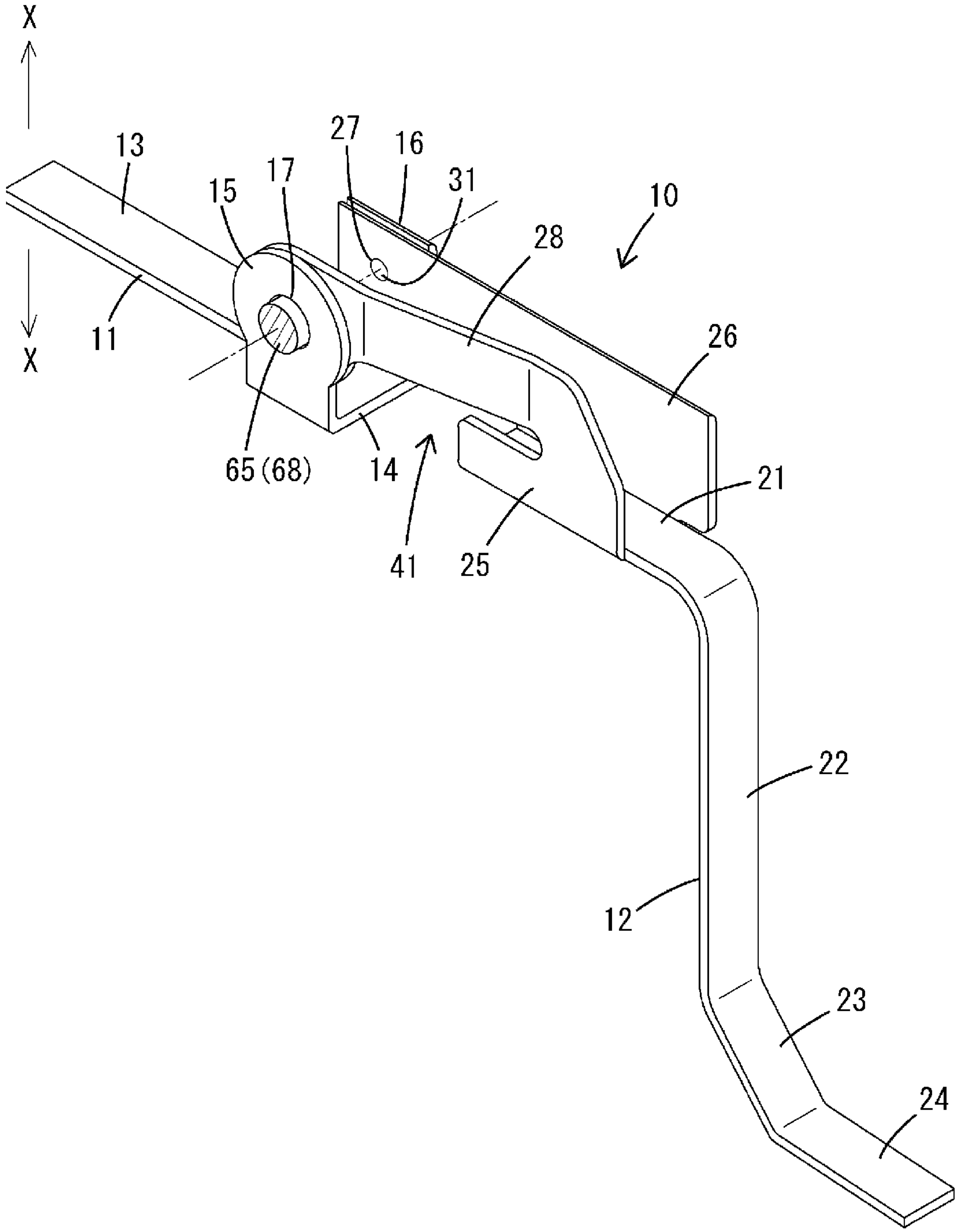
FIG. 4 is a perspective view of the terminal fitting of the embodiment showing a state supported by the one-side supporting portion.

Further, as shown in FIGS. 4 and 5, the second member 12 includes a fixed end portion 25 rising from one side edge in the width direction of the base portion 21 and a facing portion 26 rising from the other side end in the width direction of the base portion 21 and facing the fixed end portion 25. The fixed end portion 25 and the facing portion 26 are arranged with plate surfaces facing in the width direction orthogonal to the base portion 21. As shown in FIG. 6, the fixed end portion 25 is in the form of a rectangular plate long in the front-rear direction and has a front end at the same position as the front end of the base portion 21 and a rear end at a position behind a center in the front-rear direction of the base portion 21. The facing portion 26 is in the form of a rectangular plate long in the front-rear direction and formed to have a larger height than the fixed end portion 25. The facing portion 26 has a front end forward of the front end of the base portion 21 and has a rear end rearward of the rear end of the fixed end portion 25 and on a rear side of the base portion 21.

As shown in FIG. 5, the facing portion 26 includes a second bulging portion 27 on a front side of a part projecting further forward than the front end of the base portion 21. The second bulging portion 27 is formed to hemispherically bulge on the outer surface of the facing portion 26 by striking the inner surface of the facing portion 26. The second bulging portion 27 is fit into the first bulging portion 19 from inside and can slide on the curved inner surface of the first bulging portion 19.

The second member 12 includes a resilient portion 28 projecting forward from an upward projecting part on the rear side of the fixed end portion 25. The resilient portion 28 is inclined in a direction to be separated from the facing portion 26 from a rear end part toward a front side. The resilient portion 28 is deflectable and deformable in the width direction with a base end part on the side of the fixed end portion 25 as a fulcrum. A front end part of the resilient portion 28 is ring-shaped in a side view and includes a bearing portion 29 in the form of a circular hole penetrating in the width direction (plate thickness direction) in a central part. The bearing portion 29 is arranged at a position coaxial with the second bulging portion 27 in the width direction. The bearing portion 29 has an opening diameter larger than the hole portion 17. The shaft portion 18 of the one-side rising portion 15 is fit into the bearing portion 29 of the resilient portion 28 from outside and can slide on the inner peripheral surface of the bearing portion 29 in a circumferential direction.

The second member 12 is heavier than the first member 11 since having the resilient portion 28, the facing portion 26, the base portion 21, the extending portion 22 and the board connecting portion 24. Thus, a center of gravity of the terminal fitting 10 is located on the side of the second member 12.

<Coupling Structure of Terminal Fitting 10 and Overall Structure of Connector>

By fitting the second bulging portion 27 into the first bulging portion 19 from inside and fitting the shaft portion 18 of the one-side rising portion 15 into the bearing portion 29 from outside, the rear end part (one-side rising portion 15 and other-side rising portion 16) of the first member 11 and the front end part (resilient portion 28 and facing portion 26) of the second member 12 overlap in the width direction (plate thickness direction), and the shaft portion 18, the bearing portion 29, the first bulging portion 19 and the second bulging portion 27 are coupled side by side on the same axis in the width direction to form a coupling portion 31 in that overlapping part in the terminal fitting 10 as shown in FIG. 4. The resilient portion 28 rides on the shaft portion 18 to be deflected and deformed toward the facing portion 26 in a coupling process, and resiliently returns when the shaft portion 18 reaches a position to be fit into the bearing portion 29. On the other hand, the facing portion 26 is not deflected and deformed and the second bulging portion 27 is fit into the first bulging portion 19, utilizing the deflection of the resilient portion 28.

The first and second members 11, 12 are coupled rotatably about the coupling portion 31. In the coupled state, the first and second members 11, 12 form a separation space 41 in the front-rear direction between the rear end of the base end portion 14 and the front end of the base portion 21 as shown in FIG. 4. Then, the first and second members 11, 12 are maintained in such initial postures that the terminal connecting portion 13 is horizontally arranged in the front-rear direction and the extending portion 22 is arranged in the vertical direction by a friction force between the shaft portion 18 and the bearing portion 29 and a friction force between the first and second bulging portions 19, 27 (see FIGS. 1 and 4).

When the first and second members 11, 12 rotate from the initial postures, relative positions of the terminal connecting portion 13 and the board connecting portion 24 are displaced in the vertical direction (directions of arrows X of FIG. 4). Here, the first and second members 11, 12 can be in such inclined postures to displace the tip of the terminal connecting portion 13 upward or downward.

Subsequently, the terminal fitting 10 is inserted into the insertion hole 64 of the housing 60 from behind. The terminal connecting portion 13 of the first member 11 is arranged to project into the fitting space 63. The extending portion 22, the relay portion 23 and the board connecting portion 24 are arranged to be exposed behind the back wall 61. In the insertion hole 64 of the back wall 61, the one-side supporting portion 65 is resiliently fit into the hole portion 17 of the one-side rising portion 15 and the first bulging portion 19 of the other-side rising portion 16 is resiliently fit to the supporting surface 67 of the other-side supporting portion 66. The housing 60 constitutes a rotation center portion 68 for the terminal fitting 10 as shown in FIG. 1 at a position where the one-side supporting portion 65 and the one-side rising portion 15 are fit and a position where the other-side supporting portion 66 and the other-side rising portion 16 are fit. The resilient portion 28, the facing portion 26, the base end portion 14 and a front part of the base portion 21 are loosely inserted into the insertion hole 64 and form a clearance between these and the inner surface of the insertion hole 64 of the back wall 61. In this way, the terminal fitting 10 becomes rotatable about the rotation center portion 68 while being disposed in the housing 60.

If the connector is carried into an unillustrated reflow furnace and solder applied to the surface of the circuit board 70 is heated and melted, the solder adheres to the board connecting portions 24. Thereafter, the solder is cooled and solidified, whereby the board connecting portions 24 are electrically connected to the conductive parts on the surface of the circuit board 70.

The housing 60 and the circuit board 70 may be deformed to warp due to heat in the reflow furnace. As described above, the terminal fitting 10 has the center of gravity on the side of the second member 12 and is rotatable from the initial posture about the rotation center portion 68. Thus, even if the circuit board 70 is deformed, the terminal fitting 10 rotates in a direction in which the board connecting portion 24 follows the circuit board 70 and a state where the board connecting portion 24 is in contact with the surface of the circuit board 70 can be maintained. As a result, the connection reliability of the board connecting portion 24 with the circuit board 70 can be ensured.

If the circuit board 70 is deformed and the terminal fitting 10 rotates to have an inclined posture, the tip of the terminal connecting portion 13 is displaced upward or downward. Then, when the housing 60 is connected to the mating housing 90, the terminal connecting portion 13 may not be connected in a proper posture to the mating terminal fitting 80. However, in the case of this embodiment, the first and second members 11, 12 are rotatable about the rotation center portion 68 and the terminal connecting portion 13 of the first member 11 and the board connecting portion 24 of the second member 12 are relatively displaceable with respect to each other.

Thus, if the terminal fitting 10 is in an inclined posture, the first member 11 is pressed by the mating terminal fitting 80 and rotates about the coupling portion 31 with respect to the housing 60 in a connection process to the mating terminal fitting 80. Then, the terminal connecting portion 13 is displaced and set in a horizontal posture according to the rotation of the first member 11 and an appropriate connected state to the mating terminal fitting 80 is realized. On the other hand, the second member 12 does not follow the rotation of the first member 11. Similarly, the board connecting portion 24 also does not follow a displacement of the terminal connecting portion 13. Thus, a state where the board connecting portion 24 is connected to the conductive part of the circuit board 70 can be satisfactorily maintained. Therefore, according to this embodiment, the terminal fitting 10 can ensure connection reliability as a whole.

In the case of this embodiment, the relative positions of the board connecting portion 24 and the terminal connecting portion 13 are made displaceable by rotatably coupling the first and second members 11, 12. Thus, a structure is not particularly complicated.

Further, the shaft portion 18 can be fit into the bearing portion 29 with a deep engagement margin by being accompanied by the deflection of the resilient portion 28, and the coupled state of the first and second members 11, 12 can be satisfactorily maintained.

Further, since the center of gravity of the terminal fitting 10 is located on the side of the second member 12, a state of the board connecting portion 24 connected to the circuit board 70 can be satisfactorily maintained. Since the center of gravity of the terminal fitting 10 can be located on the side of the second member 12 by the weight of the resilient portion 28 in this case, it is not necessary to provide a special structure for locating the center of gravity on the side of the second member 12.

Further, since the relative positions of the board connecting portion 24 and the terminal connecting portion 13 are displaceable in a direction (vertical direction) orthogonal to a direction (width direction) in which the resilient portion 28 is deflected and deformed, the mutual interference of displacements of the board connecting portion 24 and the terminal connecting portion 13 and the deflection of the resilient portion 28 can be prevented. As a result, the connection reliability of the terminal fitting 10 can be more satisfactorily ensured.

Furthermore, since the first and second members 11, 12 are coupled via the coupling portion 31 and the coupling portion 31 also serves as the rotation center portion 68 of the housing 60, the coupled state of the first and second members 11, 12 and a supported state of the first and second members 11, 12 in the housing 60 can be reliably realized by a simple configuration.

[Other Embodiments of Present Disclosure]

The embodiment disclosed this time should be considered illustrative in all aspects, rather than restrictive.

Although the terminal fitting 10 is composed of the first and second members 11, 12 in the case of the above embodiment, a terminal fitting may include another member in addition to first and second members as another embodiment. In this case, the first and second members may be indirectly coupled via the other member. In short, the first and second members only have to be configured to be electrically connected.

Although the first and second members 11, 12 are coupled via the coupling portion 31 in the case of the above embodiment, a first member and a second member may be rotatably coupled and supported by a supporting portion (rotation center portion) of a housing without via a coupling portion as another embodiment.

Although the coupling portion 31 coupling the first and second members 11, 12 is provided on the rear side of the terminal connecting portion 13 in the case of the above embodiment, a coupling portion only has to be provided between a terminal connecting portion and a board connecting portion and, for example, may be provided above the board connecting portion (extending portion, relay portion, etc.) as another embodiment.

LIST OF REFERENCE NUMERALS

10 . . . terminal fitting
11 . . . first member
12 . . . second member
13 . . . terminal connecting portion
14 . . . base end portion
15 . . . one-side rising portion
16 . . . other-side rising portion
17 . . . hole portion
18 . . . shaft portion
19 . . . first bulging portion
21 . . . base portion
22 . . . extending portion
23 . . . relay portion
24 . . . board connecting portion
25 . . . fixed end portion
26 . . . facing portion
27 . . . second bulging portion
28 . . . resilient portion
29 . . . bearing portion

31 . . . coupling portion
41 . . . separation space
60 . . . housing
61 . . . back wall
62 . . . peripheral wall
63 . . . fitting space
64 . . . insertion hole
65 . . . one-side supporting portion
66 . . . other-side supporting portion
67 . . . supporting surface
68 . . . rotation center portion
70 . . . circuit board
80 . . . mating terminal fitting
81 . . . box portion
90 . . . mating housing
100 . . . wire

What is claimed is:

1. A connector, comprising:

a terminal fitting; and a housing for disposing the terminal fitting, the terminal fitting including:

a first fitting including:

a terminal connecting portion to be connected to a mating terminal fitting; and a second fitting including:

a base portion extending in a front-rear direction;

a resilient portion provided on a front end portion of the base portion and including a bearing portion;

an extending portion extending downward from a rear end portion of the base portion; and a board connecting portion provided on an end portion of the extending portion, extending in the front-rear direction, and to be connected to a circuit board, wherein:

the first fitting is provided with a shaft portion to be fit into the bearing portion of the resilient portion of the second fitting, the first fitting is rotatably coupled to the second fitting such that relative positions of the terminal connecting portion and the board connecting portion are displaceable with respect to each other, and the housing includes a supporting portion for rotatably supporting the first and second fittings.

2. The connector of claim 1, wherein a center of gravity of the terminal fitting is located on the second fitting.

3. The connector of claim 1, wherein the relative positions of the board connecting portion and the terminal connecting portion are displaceable in a direction orthogonal to a direction in which the resilient portion is deflected and deformed.

4. The connector of claim 1, wherein the board connecting portion contacts the circuit board, and the relative positions of the terminal connecting portion and the board connecting portion are displaceable with respect to each other in response to deformation of the circuit board.

* * * * *